US010404457B2

United States Patent
Badawy et al.

(10) Patent No.: US 10,404,457 B2
(45) Date of Patent: Sep. 3, 2019

(54) METHOD FOR GENERATING A SECRET KEY FOR ENCRYPTED WIRELESS COMMUNICATIONS

(71) Applicant: QATAR UNIVERSITY, Al Tarfa, Doha (QA)

(72) Inventors: Ahmed Badawy, Doha (QA); Tamer Khattab, Doha (QA); Tarek Elfouly, Doha (QA); Carla Fabiana Chiasserini, Turin (IT); Amr Mohamed, Doha (QA); Daniele Trinchero, Turin (IT)

(73) Assignee: Qatar University, Doha (QA)

( * ) Notice: Subject to any disclaimer, the term of this patent is extended or adjusted under 35 U.S.C. 154(b) by 256 days.

(21) Appl. No.: 15/600,680

(22) Filed: May 19, 2017

(65) Prior Publication Data

US 2017/0338956 A1 Nov. 23, 2017

Related U.S. Application Data

(60) Provisional application No. 62/339,797, filed on May 20, 2016.

(51) Int. Cl.
*H04L 9/08* (2006.01)
*H04L 29/06* (2006.01)
(Continued)

(52) U.S. Cl.
CPC .......... *H04L 9/0869* (2013.01); *H04L 9/0643* (2013.01); *H04L 9/0866* (2013.01);
(Continued)

(58) Field of Classification Search
CPC . H04L 9/0869; H04L 63/0435; H04L 9/0643; H04L 9/0866; H04L 63/06; H04L 2209/80; H04W 12/02; H04W 12/04
See application file for complete search history.

(56) References Cited

U.S. PATENT DOCUMENTS

| 5,604,806 A | 2/1997 | Hassan et al. |
| 7,787,627 B2 * | 8/2010 | Sood ..................... H04L 9/0836 380/270 |

(Continued)

OTHER PUBLICATIONS

Mathur et al., "Radio-telepathy: extracting a secret key from an unauthenticated wireless channel," Proceedings of the 14th ACM international conference on Mobile computing and networking, ACM, 2008.

(Continued)

*Primary Examiner* — Ayoub Alata
(74) *Attorney, Agent, or Firm* — Richard C. Litman

(57) ABSTRACT

The method for generating a secret key for encrypted wireless communications is a physical layer technique that exploits channel randomness between two nodes, the channel being characterized by reciprocity between the two nodes. Reference signals exchanged by the two nodes are used to faun a channel estimate, including gain location and phase location. The gain and phase locations are compared to threshold values, and locations exceeding the respective thresholds are stored in vectors. The moving differences between gain and phase locations at adjacent sampling times define secondary random processes. The moving difference values are quantized and converted to bit streams, which are concatenated to generate the secret key. Measures are provided to reduce parity errors, thereby reducing the bit mismatch rate (BMR).

4 Claims, 5 Drawing Sheets

(51) Int. Cl.
*H04L 9/06* (2006.01)
*H04W 12/02* (2009.01)
*H04W 12/04* (2009.01)

(52) U.S. Cl.
CPC .......... *H04L 63/0435* (2013.01); *H04L 63/06* (2013.01); *H04W 12/02* (2013.01); *H04W 12/04* (2013.01); *H04L 2209/80* (2013.01)

(56) References Cited

U.S. PATENT DOCUMENTS

| | | | |
|---|---|---|---|
| 8,503,673 | B2 | 8/2013 | Patwari et al. |
| 8,515,061 | B2 | 8/2013 | Patwari et al. |
| 8,744,082 | B2 | 6/2014 | Ly et al. |
| 2007/0036353 | A1 | 2/2007 | Reznik et al. |
| 2007/0165845 | A1 | 7/2007 | Ye et al. |
| 2010/0067701 | A1* | 3/2010 | Patwari ................ H04L 9/0838 380/279 |
| 2011/0280397 | A1* | 11/2011 | Patwar .................. H04L 63/06 380/44 |
| 2012/0106739 | A1* | 5/2012 | Ly ........................ H04L 9/0875 380/270 |
| 2012/0294443 | A1 | 11/2012 | Mathur et al. |
| 2017/0012771 | A1* | 1/2017 | Mueller ................ H04L 9/0827 |
| 2017/0180168 | A1* | 6/2017 | Terry ................... H04B 7/0413 |

OTHER PUBLICATIONS

Mathur et al., "Proximate: proximity-based secure pairing using ambient wireless signals," Proceedings of the 9th international conference on Mobile systems, applications, and services, ACM, 2011.

Badawy, A. et al., "Chanel Secondary Random Process for Robust Secret Key Generation," 2015 International Wireless Communications and Mobile Computing Conference, IEEE, pp. 114-119 (Aug. 24, 2015).

Jeong, S. H. et al., "Bit Manipulation Accelerator for Communication Systems Digital Signal Processor," EURASIP Journal on Applied Signal Processing (2005)16, pp. 2655-2663 (Sep. 21, 2005).

* cited by examiner

METHOD FOR GENERATING A SECRET KEY FOR ENCRYPTED WIRELESS COMMUNICATIONS

CROSS-REFERENCE TO RELATED APPLICATION

This claims the benefit of U.S. Provisional Patent Application Ser. No. 62/339,797, filed on May 20, 2016.

BACKGROUND OF THE INVENTION

1. Field of the Invention

The present invention relates to encryption of signals, and particularly to a method for generating a secret key for encrypted wireless communications in which a secret key is generated by two separate random processes. The application claims priority to U.S. Provisional Patent Application Ser. No. 62/339,797, filed on May 20, 2016, which is hereby incorporated by reference in its entirety.

2. Description of the Related Art

Orthogonal frequency division multiplexing (OFDM) is a multi-carrier modulation scheme that has been widely adopted in many wireless communication systems, such as Long Term Evolution (LTE) systems, for example. It provides many advantages over the single-carrier modulation schemes, including high data rates, immunity to selective fading, resilience to inter-symbol interference and higher spectrum efficiency. As in any wireless communication system, security of OFDM wireless system is a critical issue. Currently, security relies on cryptographic techniques and protocols that lie at the upper layers of the wireless network. One main drawback of these solutions is the necessity of a complex key management scheme, in the case of symmetric ciphers, and high computational complexity, in the case of asymmetric ciphers. On the other hand, physical layer security relies on the randomness of the communication channel and has a much lower computational complexity.

Within the paradigm of physical layer security, typically a physical layer specific characteristic is used as a key generator to guarantee information is hidden from eavesdroppers. Such techniques are typically based on a channel reciprocity assumption. When two antennae communicate by radiating the same signal through a linear and isotropic channel, the signals received by each antenna will be identical. This is due to the reciprocity of the radiating and receiving antenna pattern. Channel measurements have been exploited to solve the problem of secret key generation (SKG). It has been observed that the maximum size of the generated secret key mainly depends on the mutual information between the channel estimates at the two legitimate nodes. An expression has been derived for the mutual information for a general multipath channel.

The most common feature of the channel characteristics that is used is channel gain, mainly because of its ease of implementation. Others exploit the channel phase to generate the secret key. Unlike channel gain, channel phase is uniformly distributed in narrowband fading channels. Researchers have been able to generate a long key, compared to the conventional cryptographic techniques, from the estimated channel phase, even extending their system to the use of relay nodes.

Exploiting the channel estimates to generate a secret key has also been investigated under multiple antenna scenarios and relaying scenarios. A technique presently exists to extract a secret key based on level crossing of the estimated channel gain. The main advantage of this level crossing technique is that it achieves a low bit mismatch rate (BMR) between the key generated at the legitimate nodes. Researchers have studied the channel probing rate effect on the secret key rate for different Doppler shifts. It was found that the secret key rate increases as the probing rate increases, and saturates at a 20 KHz probing rate for the worst case Doppler shift assumed. The smaller the Doppler shift, the smaller the probing rate required to saturate the secret key rate. It has also been observed that as the carrier frequency increases, the probing rate should increase to achieve a suitable key rate. This is mainly because the channel temporal variation increases at higher carrier frequencies.

One main advantage of exploiting channel estimates to generate the secret key is its high key generation rate. However, a main drawback of exploiting the channel reciprocity to generate secret keys is that the additive white Gaussian noise (AWGN) at both receivers affects the reciprocity of the channel measurements. This drawback causes the BMR between the legitimate nodes to rise, which affects the operation of the SKG based on channel estimates at low and medium signal to noise ratio (SNR) scenarios. Thus, a method for generating a secret key for encrypted wireless communications solving the aforementioned problems is desired.

SUMMARY OF THE INVENTION

The method for generating a secret key for encrypted wireless communications is a physical layer technique that exploits channel randomness between two nodes, the channel being characterized by reciprocity between the two nodes. Reference signals exchanged by the two nodes are used to form a channel estimate, including gain and phase. The gain and phase estimates are compared to respective threshold values, and locations (i.e., x-axis points or time stamps) where gain and phase exceeding the threshold values are stored in vectors. The moving differences between gain locations and phase locations at adjacent sampling times define secondary random processes. The moving difference values are quantized and converted to bit streams, which are concatenated to generate the secret key. Measures are provided to reduce parity errors, thereby reducing the bit mismatch rate (BMR).

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method for generating a secret key for encrypted wireless communications is a physical layer technique that exploits channel randomness between two nodes, the channel being characterized by reciprocity between the two nodes. Reference signals exchanged by the two nodes are used to form a channel estimate, including gain and phase. The gain and phase estimates are compared to respective threshold values, and locations (i.e., x-axis points or time stamps) where gain and phase exceeding the threshold values are stored in vectors. The moving differences between gain locations and phase locations at adjacent sampling times define secondary random processes. The moving difference values are quantized and converted to bit streams, which are concatenated to generate the secret key. Measures are provided to reduce parity errors, thereby reducing the bit mismatch rate (BMR).

Figure 1:
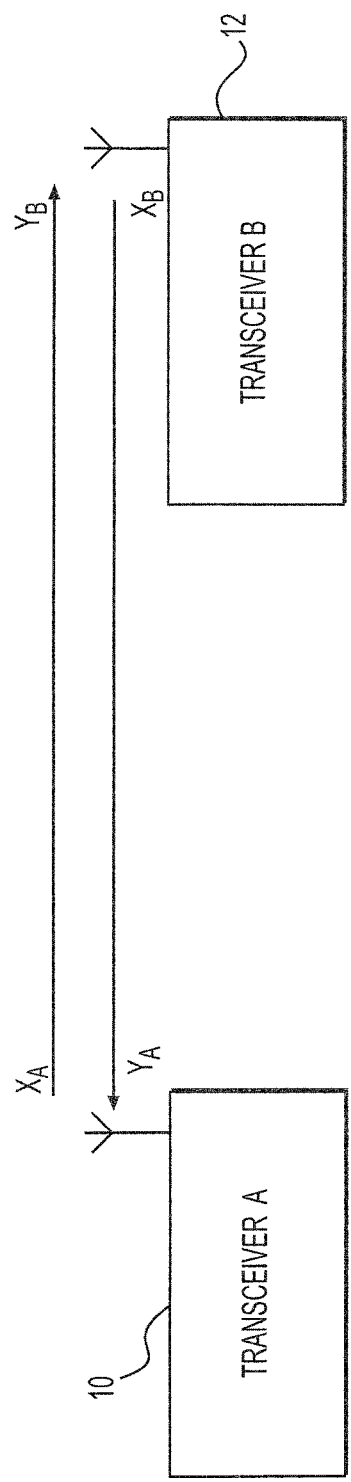
FIG. 1 is a schematic diagram showing a pair of transceivers communicating with each other using a method for generating a secret key for encrypted wireless communications according to the present invention.

As illustrated in FIG. 1, initially, a reference signal is exchanged between a first transceiver 10 (transceiver "A") and a second transceiver 12 (transceiver "B"). This may be represented as:

$$y_A[n]=x_B[n] \otimes h[n]+w_A[n], \text{ for } n=1,\ldots,N \quad (1)$$

$$y_B[n]=x_A[n] \otimes h[n]+w_B[n], \text{ for } n=1,\ldots,N, \quad (2)$$

where $y_A$ is the signal received by the first transceiver (transceiver "A"), $y_B$ is the signal received by the second transceiver (transceiver "B"), $x_B$ is the transmitted reference signal from the second transceiver, $x_A$ is the transmitted reference signal from the first transceiver, $w_A$ is the additive white Gaussian noise (AWGN) at the first receiver, $w_B$ is the AWGN at the second receiver, h is the channel coefficient, n represents the n-th sample number of the N total collected samples, and the operator $\otimes$ represents the convolution operation.

Figure 2:
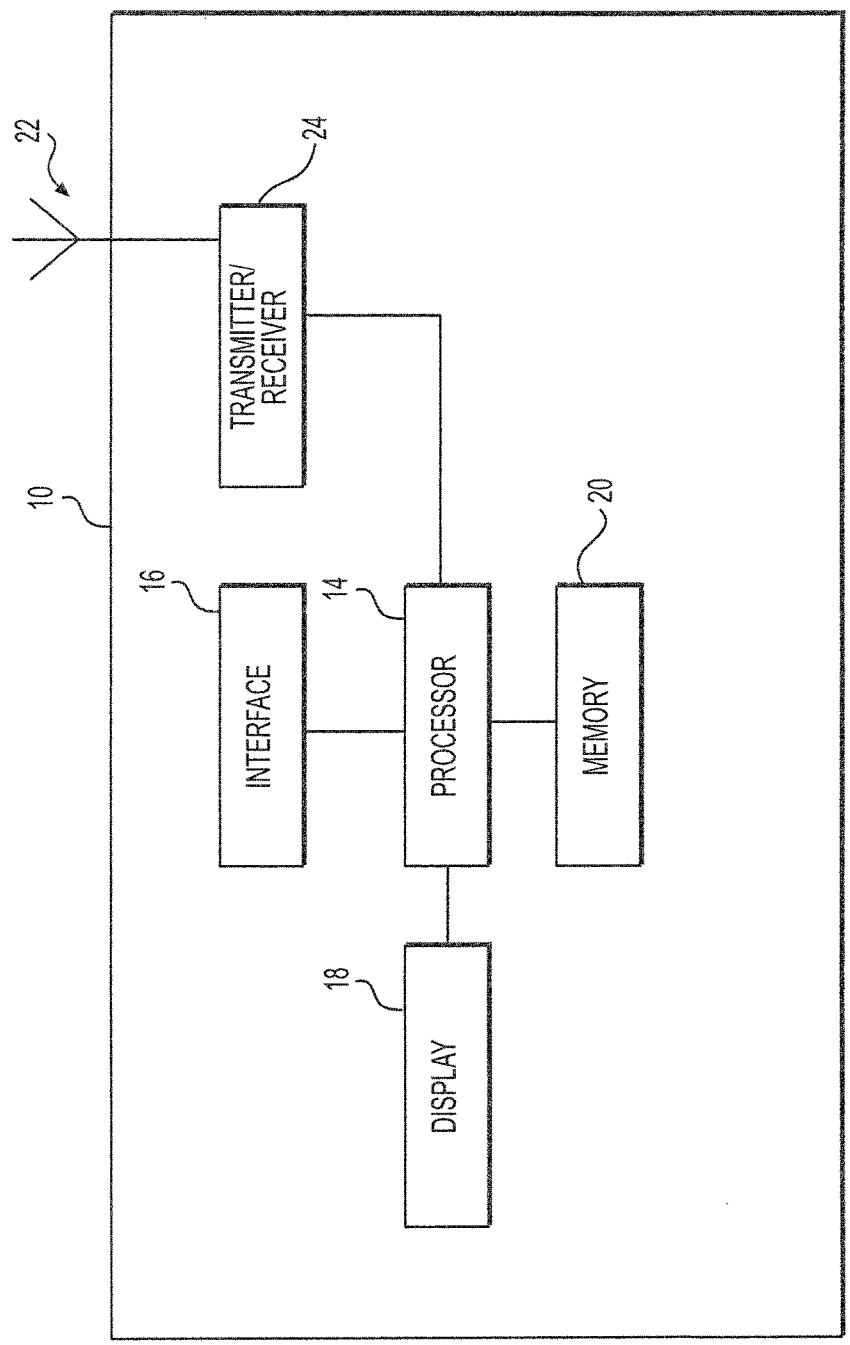
FIG. 2 is a block diagram showing system components of an exemplary transceiver for implementing method for generating a secret key for encrypted wireless communications according to the present invention.

It should be understood that transceivers 10, 12 may be any suitable type of transceivers and that the calculations associated therewith may be performed by any suitable associated computer system, such as that diagrammatically shown in FIG. 2. Although FIG. 2 only illustrates the system components of first transceiver 10, it should be understood that the second transceiver 12 operates in an identical manner. Data is entered by the user via any suitable type of user interface 16, and may be stored in memory 20, which may be any suitable type of computer readable and programmable memory and is preferably a non-transitory, computer readable storage medium. Calculations are performed by processor 14, which may be any suitable type of computer processor and may be displayed to the user on display 18, which may be any suitable type of computer display. Transmission and reception are performed by a conventional transmitter/receiver unit 24 in communication with conventional antenna 22.

Processor 14 may be associated with, or incorporated into, any suitable type of computing device, for example, a personal computer or a programmable logic controller. The display 18, the processor 14, the memory 20, the transmitter/receiver unit 24 and any associated computer readable recording media are in communication with one another by any suitable type of data bus, as is well known in the art. Alternatively, the steps of the method may be carried out by a digital signal processor (DSP) connected to the processor of a cellular telephone, two-way mobile or portable radio, base station transceiver, wireless modem or router, or other suitable communications device.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 20, or in place of memory 20, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

Figure 3:
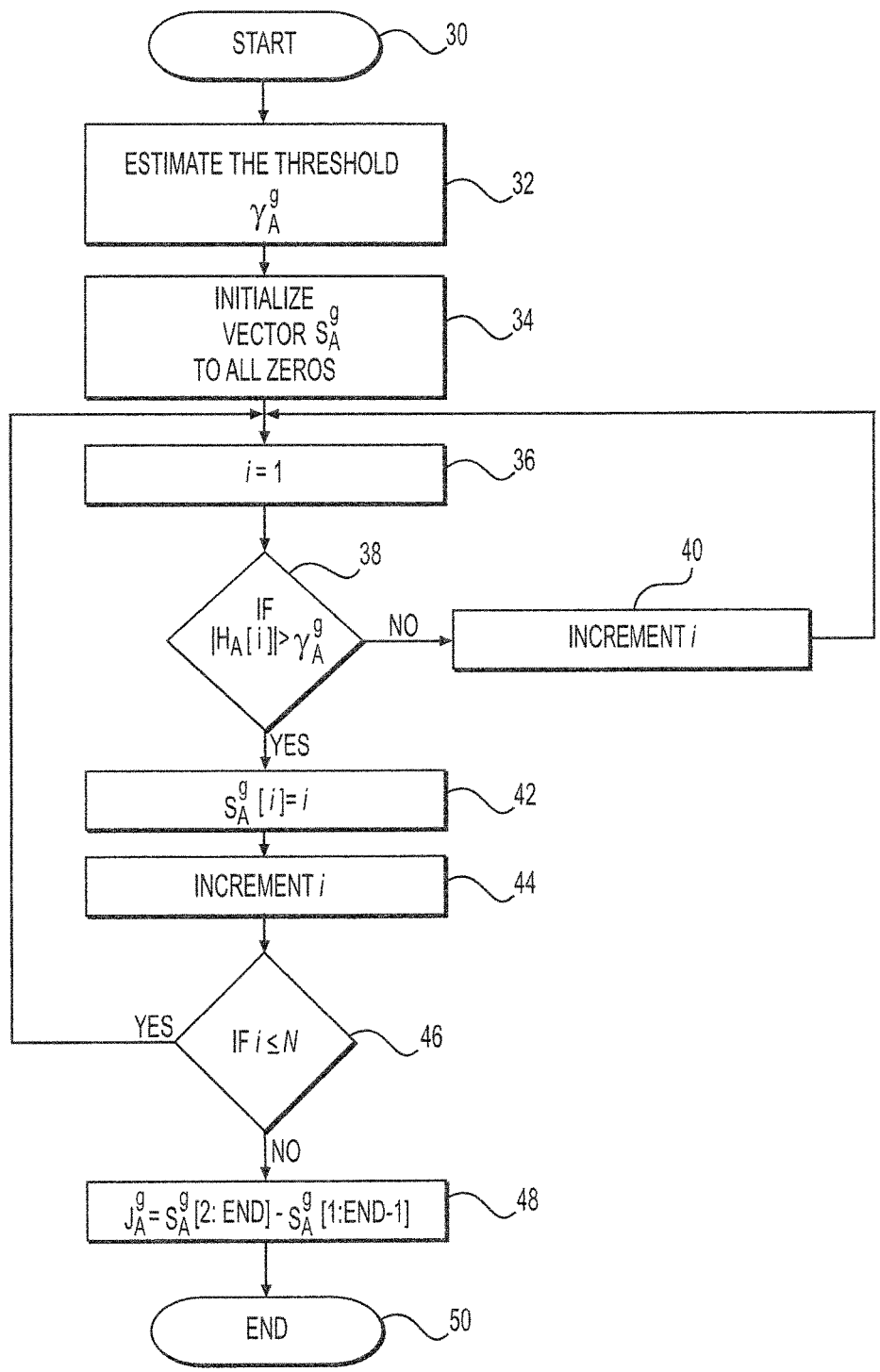
FIG. 3 is a flowchart showing steps of the method for generating a secret key for encrypted wireless communications according to the present invention.

The first transceiver 10 and the second transceiver 12 each respectively estimate first and second random channel coefficients, $H_A$ and $H_B$, respectively, where each of the first and second random channel coefficients has a gain and a phase associated therewith. The first transceiver 10 and the second transceiver 12 then each respectively estimate first and second gain thresholds based on the respective gains of the first and second random channel coefficients as:

$$\gamma_A^g=E[|H_A|]+\alpha\text{std}(|H_A|) \quad (3)$$

$$\gamma_B^g=E[|H_B|]+\alpha\text{std}(|H_B|), \quad (4)$$

where $\gamma_A^g$ and $\gamma_B^g$ are the respective thresholds estimated by the first and second transceivers, E[.] denotes the expectation operator, std(.) denotes the standard deviation, and $\alpha$ is a design parameter $\in[-1:1]$. In FIG. 3, after the process start at step 30, the above is represented by step 32.

Next, the first transceiver 10 and the second transceiver 12 each respectively estimate first and second phase thresholds based on the respective phases of the first and second random channel coefficients in a manner similar to that described above with regard to the gain thresholds. The first transceiver 10 and the second transceiver 12 recursively compare the respective gains of the first and second random channel coefficients to the first and second gain thresholds $\gamma_A^g$ and $\gamma_B^g$, respectively, and also recursively compare the respective phases of the first and second random channel coefficients to the first and second phase thresholds.

The first transceiver 10 and the second transceiver 12 then respectively estimate first and second gain locations based on the gains of the first and second random channel coefficients. Similarly, the first transceiver 10 and the second transceiver 12 respectively estimate first and second phase locations based on the phases of the first and second random channel coefficients. If the channel gain is higher than the preset threshold, the location (i.e., the index on the x-axis) is stored in a vector S, which is initialized to all zeros (step 34 in FIG. 3). First transceiver 10 and second transceiver 12 estimate their vectors as $S_A^g$ and $S_B^g$, respectively.

The first transceiver 10 and the second transceiver 12 respectively estimate first and second gain moving differences of the estimated first and second gain locations, as well as respectively estimating first and second phase moving differences of the estimated first and second phase locations. For the estimation of the moving differences of the respective estimated locations $J_A^g$ and $J_B^g$ for channel gain, this is shown in steps 36, 38, 40, 42, 44, 46 and 48 of FIG. 3 (before the process end at step 50), where the computations are performed as:

$$J_A^g = S_A^g[i+1] - S_A^g[i], \text{ for } i=1,\ldots,N-1 \text{ and} \quad (5)$$

$$J_B^g = S_B^g[i+1] - S_B^g[i], \text{ for } i=1,\ldots,N-1. \quad (6)$$

Figure 4A:
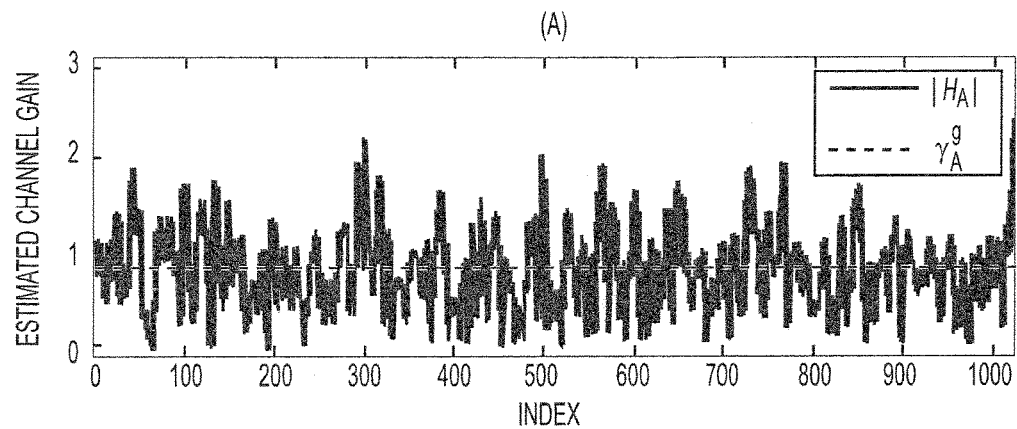
FIG. 4A is a graph showing estimated channel gain generated in the method for generating a secret key for encrypted wireless communications according to the present invention.
Figure 4B:
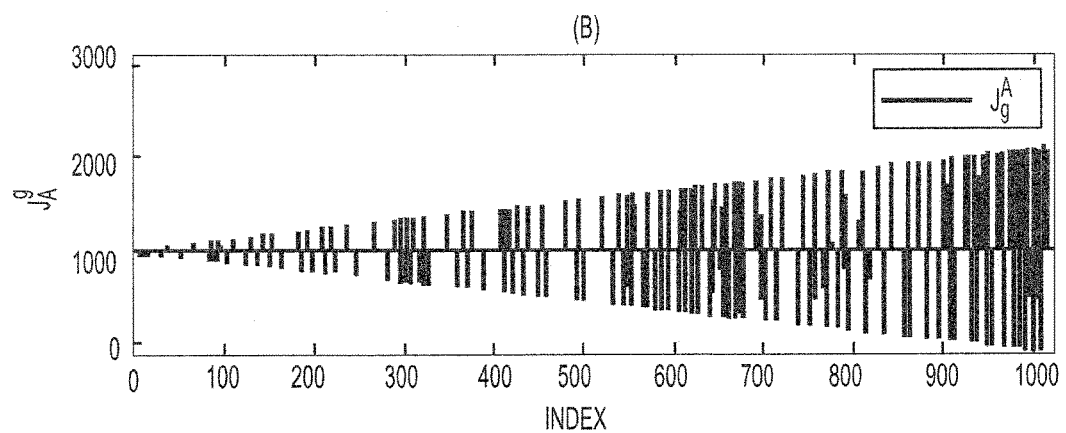
FIG. 4B is a graph showing estimated transceiver moving difference between channel gain locations generated by the method for generating a secret key for encrypted wireless communications according to the present invention.

The realizations in the vectors $J_A^g$ and $J_B^g$ constitute the realizations of the present secondary random process (SRP). It should be understood that although FIG. 3 shows the SRP process only for the first transceiver 10 (transceiver "A"), the same set of steps also applies to second transceiver 12 (transceiver "B"). Additionally, although FIG. 3 only shows the process being applied for the estimated channel gain, the same process is also applied for the estimated channel phase. In other words, both first transceiver 10 and second transceiver 12 create two SRPs, one for the channel gain ($J_A^g$ and $J_B^g$) and one for the channel phase ($J_A^p$ and $J_B^p$). These SRPs are the new common sources of randomness which are then used by first transceiver 10 and second transceiver 12 to generate the secret key. FIGS. 4A and 4B respectively show an example of the estimated channel gain at first transceiver 10 ($|H_A[i]|$) and the threshold $\gamma_A^g$ estimated in equation (3). FIG. 4B illustrates the channel gain SRP $J_A^g$ generated through the process of FIG. 3, as described above.

The first gain moving difference and the second gain moving difference are next quantized to respectively yield first and second gain quantized bit streams suitable for the secret key generation (SKG). Similarly, the first phase moving difference and the second phase moving difference are quantized to respectively yield first and second phase quantized bit streams suitable for the SKG. Any suitable quantization process, such as uniform quantization, may be used. In uniform quantization, the spaces along the x-axis are uniformly distributed. A similar process is applied for the spaces on the y-axis; i.e., the estimated secondary common source of randomness. First, both first transceiver 10 and second transceiver 12 quantize their estimated SRP vectors for the number of quantization bits, $n_Q$. First transceiver 10 quantizes $J_A^g$ and $J_A^p$ to respectively yield $Q_A^g$ and $Q_A^p$. Similarly, second transceiver 12 quantizes $J_B^g$ and $J_B^p$ to respectively yield $Q_B^g$ and $Q_B^p$. First transceiver 10 converts $Q_A^g$ and $Q_A^p$ to bits and, similarly, second transceiver 12 converts $Q_B^g$ and $Q_B^g$ to bits.

The first gain quantized bit stream and the first phase quantized bit stream are concatenated to produce a first secret key. The second gain quantized bit stream and the second phase quantized bit stream are concatenated to produce a second secret key. Here, first transceiver 10 drops the least significant bits ($n_{LSB}$) from each entry in $Q_A^g$ and $Q_A^p$ to generate $R_A^g$ and $R_A^g$. Similarly, second transceiver 12 drops the least significant bits ($n_{LSB}$) from each entry in $Q_B^g$ and $Q_B^p$ to generate $R_B^g$ and $R_B^p$. First transceiver 10 concatenates $R_A^g$ and $R_A^p$ to generate the first secret key $K_A$ as:

$$K_A = [R_A^g(1), R_A^p(1), R_A^g(12), R_A^p(2), \ldots, R_A^g(N_R), R_A^p(N_R)]. \quad (7)$$

where $N_R$ is the length of $R_A^g$. Second transceiver 12 follows an identical process to concatenate $R_B^g$ and $R_b^p$ to generate the second secret key $K_B$. It should be noted that uniform quantization is only one example of combination of bit streams, and that any suitable technique may be utilized. An alternative technique will be described below as another example.

During information reconciliation and privacy amplification, both first transceiver 10 and second transceiver 12 permute their bit streams in the same way. They then each divide the permuted bit streams into small blocks. First transceiver 10 then sends permutations and parities of each block to second transceiver 12. Second transceiver 12 compares the received parity information with the ones second transceiver 12 has already processed. In the case of parity mismatch, the second transceiver 12 changes its bits in the corresponding block to match the bits received from first transceiver 10. It should be noted that any suitable type of information reconciliation and privacy amplification may be used, as is well known in the art.

A selected hash function is then applied to the first and second secret keys for secure hashed cryptographic communication between the first and second transceivers. The hash function is selected randomly from a set of hash functions known by both first transceiver 10 and second transceiver 12. The first transceiver 10 shares the selected hash function with the second transceiver 12. The first and second transceivers respectively apply the selected hash function (i.e., the "universal" hash) to the first and second secret keys to respectively produce first and second hashed keys. Transmissions between the first and second transceivers are then encrypted with the first and second hashed keys.

It should be understood that the present method may be applied to any set of transceivers where encrypted communication is desired. In a first example, the present method may be applied to cellular communication, where first transceiver 10 is the base station, also commonly known as "eNodeB" (eNB), and second transceiver 12 is the cellular telephone, also commonly known as "user equipment" (UE). When the eNB and UE are communicating, they can generate secret keys using the present method to encrypt the regular transmitted and received data, as well as sensitive data, such as passwords and user profile information. A potential eavesdropper on the communication cannot generate the secret key through its channel since the secret key is independent of the channel between the eNB and UE. Another example is in the context of wireless communication, such as Wi-Fi signals. In such systems, first transceiver 10 is the access point (AP) communicating with a legitimate user (second transceiver 12). A potential eavesdropper, within the Wi-Fi coverage area, listening to the exchanged signal between the AP and the legitimate user cannot decrypt the data in order to spy on the legitimate user.

A third example is ad hoc communication, i.e., decentralized networks, such as user-to-user communication, vehicle communication, soldiers' wireless equipment in the battlefield, etc. In the context of vehicle-to-vehicle communication, sensitive information about road traffic, collision warnings and change of road layout is transferred between vehicles travelling on the same road. A malicious vehicle can listen to the exchanged data with the intention of causing a traffic accident, for example. Encrypting the transmitted data with a key only generated by legitimate vehicles can limit the effectiveness of a potential malicious eavesdropper.

In addition to the above examples of direct application of the present method, there are also numerous indirect applications. In the context of cloud storage, for example, users should have an on-demand access to the cloud storage server. The security of the data being saved on the cloud storage server, as well as being transferred between the users and the cloud storage server, is presently an open research area. The present method can be used to secure the saved data as well as the data being transmitted. In this case, the primary random process of the present method is not the wireless channel (as in the case of the direct applications), rather it could be any other random process generated from mechanical or electrical properties of the devices as well as the medium. As another example of indirect application, the present method can be used in the process of authenticating wireless nodes trying to access the network, as well as localization. A radio frequency (RF) fingerprint, which is a set of signal parameters unique to each node and location, is used in authentication and localization of wireless nodes. In this case, the present method is applied to this set of unique parameters, which is considered the primary random process.

Physical layer security involves exploiting channel estimates to generate secret keys. The main advantage of physical layer security is its high key generation rate. However, a main drawback of exploiting the channel reciprocity to generate secret keys is that the additive white Gaussian noise (AWGN) at both receivers affects the reciprocity of the channel measurements. This drawback causes a bit mismatch rate (BMR) between the legitimate nodes to rise, which affects the operation of the SKG based on channel estimates at low and medium signal to noise ratio (SNR) scenarios. In addition, high BMR after the quantization steps leads to a lower key generation rate. Conventional techniques rely directly on either the channel gain alone or the channel phase alone.

The present method, as described above, uses the estimated channel gain and phase to generate a SRP, which is then used to generate the secret key, rather than using the channel gain or phase directly. Unlike the channel gain or phase, the SRP is only slightly affected by the noise. As noted above, the secret key generation steps are applied on both the channel gain and phase, which are estimated simultaneously, rather than using one or the other. When combining the two bit streams from the channel gain and phase, the least significant bits are dropped to further reduce the BMR. The present method, when compared against conventional secret key generation techniques, enhances the performance of the secret key generation system at low and medium signal to noise ratio levels, as well as greatly improving the BMR and achieving a longer key length. Additionally, the objective of creating a secondary random process from the primary process is to locally and significantly reduce the bit mismatch rate between the two keys generated at the two communicating nodes. This leads to simplifying the step of information reconciliation, as well as the aforementioned longer key length. Blocks of bits with parity mismatch are dropped from the secret key. Therefore, a lower bit mismatch rate before information reconciliation will lead to lower chances of dropping blocks of generated bits. Thus, keys with longer lengths, as well as rates, can be generated.

Figure 5:
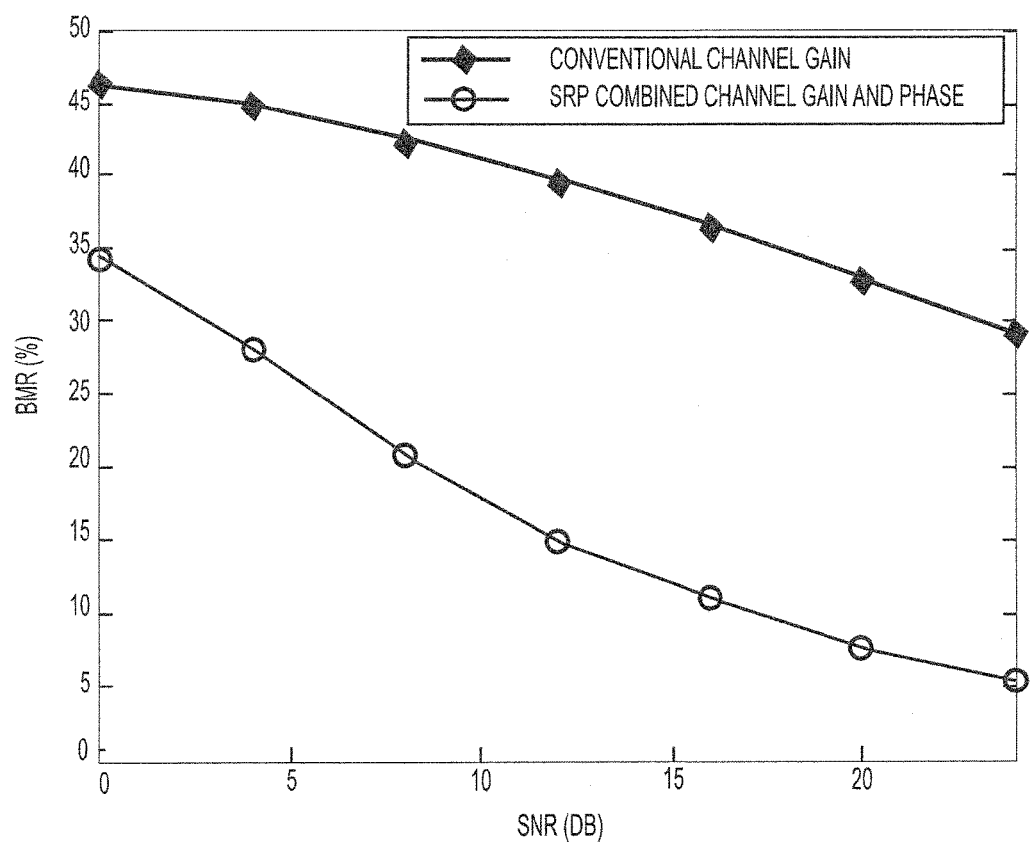
FIG. 5 is a plot comparing bit mismatch rate (BMR) as a function of signal to noise ratio (SNR) using the present method for generating a secret key for encrypted wireless communications compared against a conventional, channel gain-based encryption technique.

FIG. 5 shows an exemplary plot of the achieved BMR between first transceiver 10 and second transceiver 12 after the quantization step using 8 quantization bits for the SRP combined channel gain and phase vs. the conventional channel gain technique. The plot shows BMR vs. SNR. As seen in FIG. 5, the BMR has improved significantly, dropping from 33% for the conventional channel gain technique at SNR=30 dB to 7% for the present method. In addition, the key length of the SRP is approximately two times the key length generated by the conventional channel gain technique.

As noted above, when the two bit streams are combined, both nodes drop the least significant bits ($n_{LSB}$) from each entry in the quantized channel gain and channel phase vectors. Most of the discrepancy results from the least significant bits. Thus, dropping a few of them will further reduce the bit mismatch rate. It should be noted that the present secondary random process reduces the bit mismatch rate by exploiting the time stamps (x-axis points), which are significantly less affected by noise than the channel gain or phase points (y-axis). Therefore, dropping $n_{LSB}$ results in further significant local reduction of the bit mismatch rate.

As noted above, any suitable technique for combining the bit streams may be used. In another example, both nodes calculate the factor $n_m = \mod(n_z^g, n_z^p)$ where mod is the modulus operation, and $n_z^g$ and $n_z^p$ are the number of zeros in the channel gain and channel phase generated vectors (before quantization) $J_A^g$ and $J_A^g$, respectively. $n_m$ is only known to the communicating nodes since it is estimated from the secondary random process, to which an eavesdropper does not have access. Both nodes convert the factor $n_m$ to bits. Although removing the $n_{LSB}$ least significant bits reduces the bit mismatch rate drastically, it also reduces the length of the generated key. Therefore, the generated blocks from both channel gain and channel phase are preferably multiplied by the bits generated from $n_m$. This multiplication operation increases the length of the key considerably. Additionally, an XOR is performed on the blocks of bits generated from channel gain and channel phase to ensure that there exists no redundancy when combing these blocks. This step increases the randomness of the generated key. The output of the channel phase blocks may then be multiplexed with the output of the XOR gate interchangeably to generate the final combined bit stream. In the above, following the conversion of the quantized gain vector to the stream of gain bits and the conversion of the quantized phase vector to the stream of phase bits, the stream of gain bits is multiplexed with the stream of multiplying bits (i.e., the product of converting the factor $n_m$ to bits) to generate a secondary stream of gain bits. Similarly, the stream of phase bits is multiplexed with the stream of multiplying bits to generate a secondary stream of phase bits. The exclusive disjunction (XOR) logical operation is performed on the secondary stream of gain bits and the secondary stream of phase bits to generate an exclusive disjunction stream of bits. Finally, the exclusive disjunction stream of bits is multiplexed with the secondary stream of phase bits to generate the secret key.

In the present method, a secondary random process (SRP) is generated from a physical (or primary) random process. It should be understood that the above provides only examples of possible methods for such SRP generation, and it should be further understood that channel phase and gain are only examples of possible primary random processes. The SRP could be generated from any suitable type of primary random process, such as received signal strength, angle of arrival, distance, etc. It should be further understood that although the SRP is used in the above for key generation, the present method may be used in any suitable type of application.

It is to be understood that the present invention is not limited to the embodiments described above, but encompasses any and all embodiments within the scope of the following claims.

We claim:

1. A method for generating a secret key for encrypted wireless communications, comprising the steps of: (a) at a first node, transmitting a reference signal to a second node and receiving transmission of the reference signal from the second node within a time interval short enough to ensure reciprocity in the wireless channel between the first node and the second node; (b) forming a channel estimate of the wireless channel from the received reference signal, the channel estimate including a gain and a phase, the channel estimate defining a primary random process; (c) for each of a gain location of the gain and a phase location of the phase, defining a corresponding threshold gain and threshold phase respectively, as a function of mean and standard deviation gain and phase values when the received reference signal is sampled for an agreed number of equally spaced sample times; (d) for each of the gain and the phase, sequentially storing the gain location and storing the phase location at a sampling time in a corresponding gain vector and a corresponding phase vector when the gain at the sampling time exceeds the threshold gain and the phase at the sampling time exceeds the threshold phase; (e) for each of the gain vector and the phase vector, sequentially storing a difference between adjacent gain locations stored in the gain vector in a secondary gain vector and the difference between adjacent phase locations in the phase vector in a secondary phase vector, the secondary gain vector and the secondary phase vector defining secondary random processes; (f) calculating a factor, $n_m$, as $n_m = \mod(n^g_z, n^p_z)$, where the mod represents a modulus operation, $n^g_z$ represents a number of zeros in the secondary gain vector, and $n^p_z$ represents a number of zeros in the secondary phase vector; converting the factor, $n_m$, into a stream of multiplying bits;

(h) quantizing the secondary gain vector and quantizing the secondary phase vector to define a quantized gain vector and a quantized phase vector; (i) converting the quantized gain vector to a stream of gain bits and converting the quantized phase vector to a stream of phase bits; (j) multiplexing the stream of gain bits with the stream of multiplying bits to generate a secondary stream of gain bits; (k) multiplexing the stream of phase bits with the stream of multiplying bits to generate a secondary stream of phase bits; (l) performing an exclusive disjunction (XOR) operation on the secondary stream of gain bits and the secondary stream of phase bits to generate an exclusive disjunction stream of bits; and (m) multiplexing the exclusive disjunction stream of bits with the secondary stream of phase bits to generate the secret key; encrypting a message using the secret key; and transmitting the encrypted message over the wireless channel between the first node and the second node.

2. The method for generating a secret key according to claim 1, wherein steps (b) through (m) are performed by a digital signal processor.

3. The method for generating a secret key according to claim 1, wherein steps (a) through (m) are repeated to recalculate the secret key as the first node and the second node change relative locations.

4. The method for generating a secret key according to claim 1, wherein a secret key generated at the first node and a secret key generated at the second node are identical due to the reciprocity of the wireless channel.

* * * * *